United States Patent
Min

(10) Patent No.: US 6,976,790 B2
(45) Date of Patent: Dec. 20, 2005

(54) SEAL STRUCTURE FOR INNER-SHAFT BEARING OF A FRONT-WHEEL DRIVE VEHICLE

(75) Inventor: Kyeng Min Min, Hwseong (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 10/746,926

(22) Filed: Dec. 23, 2003

(65) Prior Publication Data

US 2004/0218842 A1    Nov. 4, 2004

(30) Foreign Application Priority Data

Apr. 29, 2003 (KR) .................... 10-2003-0027219

(51) Int. Cl.[7] .............................................. F16C 33/80
(52) U.S. Cl. ...................... 384/488; 384/480; 180/381
(58) Field of Search .............................. 384/477, 480, 384/488, 535, 536, 581, 582; 180/381

(56) References Cited

U.S. PATENT DOCUMENTS

| | | | | |
|---|---|---|---|---|
| 2,081,237 A | * | 5/1937 | Jantsch | 180/381 |
| 2,897,023 A | * | 7/1959 | Burkhalter et al. | 384/536 |
| 3,141,710 A | * | 7/1964 | Lehman | 384/477 |
| 4,452,497 A | | 6/1984 | Zillhardt | |
| 4,648,475 A | * | 3/1987 | Veglia | 180/381 |
| 4,796,722 A | * | 1/1989 | Kumagai | 180/381 |
| 4,865,470 A | * | 9/1989 | Mazziotti | 384/478 |
| 4,960,334 A | * | 10/1990 | Mazziotti | 384/486 |
| 5,033,874 A | * | 7/1991 | Rouse | 384/477 |
| 2003/0039422 A1 | | 2/2003 | Nisley et al. | |

FOREIGN PATENT DOCUMENTS

| | | |
|---|---|---|
| DE | 4204847 | 8/1992 |
| JP | 06-33943 | 2/1994 |

* cited by examiner

*Primary Examiner*—Thomas R. Hannon
(74) *Attorney, Agent, or Firm*—Morgan Lewis & Bockius LLP

(57) ABSTRACT

A seal structure for an inner-shaft bearing of a front-wheel drive vehicle includes an inner-shaft interconnecting a differential gear to a drive shaft for achieving balance between a left wheel drive shaft and a right wheel drive shaft. An inner-shaft bearing is assembled to the inner shaft and sealed with an inner seal member. A bracket is connected to the vehicle body and fixed to the circumference of the inner-shaft bearing for supporting the inner-shaft. A first dust cover is inserted to the inner-shaft for enclosing one end of the bracket, and a second dust cover is inserted to the drive shaft for enclosing the other end of the bracket.

6 Claims, 2 Drawing Sheets

SEAL STRUCTURE FOR INNER-SHAFT BEARING OF A FRONT-WHEEL DRIVE VEHICLE

CROSS-REFERENCE TO RELATED APPLICATIONS

This application claims priority of Korean Application No. 10-2003-0027219, filed on Apr. 29, 2003.

FIELD OF THE INVENTION

The present invention relates to a seal structure of an inner-shaft bearing, and more particularly, to a seal structure of an inner-shaft bearing for preventing the inner-shaft bearing from rapidly wearing.

BACKGROUND OF THE INVENTION

Generally, a conventional front-wheel drive vehicle has two drive shafts, each of which interconnects a transmission and a front wheel such that the driving force outputted from the transmission is transferred to the front wheels. Typically, the left wheel drive shaft is directly connected to a differential gear, and the right wheel drive shaft is connected to the differential gear through an inner-shaft.

The inner-shaft is mounted to the vehicle body by a supporting means in order to interconnect the differential gear and the right wheel drive shaft such that a balance between the left wheel, driven by the left wheel drive shaft, and the right wheel, driven by the right drive shaft, can be achieved. In order to prevent moisture or dust from infiltrating into the inner-shaft bearing, typically a complex quadruple seal structure is provided.

However, such a seal structure is complicated and takes a relatively long time to assemble. Furthermore, when the inner-shaft bearing emits heat during the driving of the inner-shaft, the pressure inside of the bracket sealed with the first packing and the second packing is increased such that the first packing and the second packing expand and the lubricating oil can leak out thereof.

SUMMARY OF THE INVENTION

An exemplary seal structure for an inner-shaft bearing of a front-wheel drive vehicle according to an embodiment of the present invention includes an inner-shaft interconnecting a differential gear to one of drive shafts for achieving balance between the left wheel drive shaft and the right wheel drive shaft; a inner-shaft bearing assembled to the inner shaft and sealed with an inner seal member; a bracket connected to the vehicle body and fixed to the circumference of the inner-shaft bearing for supporting the inner-shaft; a first dust cover inserted to the inner-shaft for enclosing one end of the bracket; and a second dust cover inserted to the drive shaft for enclosing the other end of the bracket.

Preferably, each end of the bracket has a hollow portion, and each of the dust covers has a detent portion such that the hollow portion receives the detent portion.

Preferably, the first and second dust covers are inwardly stepped with respect to the bracket such that the dust covers respectively surround the ends of the bracket.

In a further embodiment, the seal structure of an inner-shaft bearing further includes an auxiliary cover assembled to the vehicle body for enclosing the bracket and the dust covers.

In an alternative embodiment a seal structure for an inner-shaft bearing of a front-wheel drive vehicle comprises two inner seal members, a bracket, first and second dust covers and an auxiliary cover. The inner seal members are received in opposite sides of the inner-shaft bearing. The bracket is configured and dimensioned to be fixed to the vehicle for supporting the inner-shaft bearing and to extend around the inner-shaft bearing with opposite ends on opposite sides of the inner-shaft bearing. The first and second dust covers cooperate respectively with opposite ends of the bracket such that each dust cover is spaced about one millimeter from the bracket to prevent entry of dust and permit emission of heat. The auxiliary cover extends around the dust covers and bracket to be secured to the vehicle.

Preferably, each end of the bracket defines a recess and each dust cover has a detent portion configured to mate with the recesses. Also, each dust cover is inwardly stepped with respect to the bracket such that the dust covers surround the ends of the bracket.

Embodiment of the present invention thus provide a seal structure for an inner shaft bearing of a front-wheel drive vehicle having non-limiting advantages of efficiently sealing the inner-shaft bearing with a simple structure.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
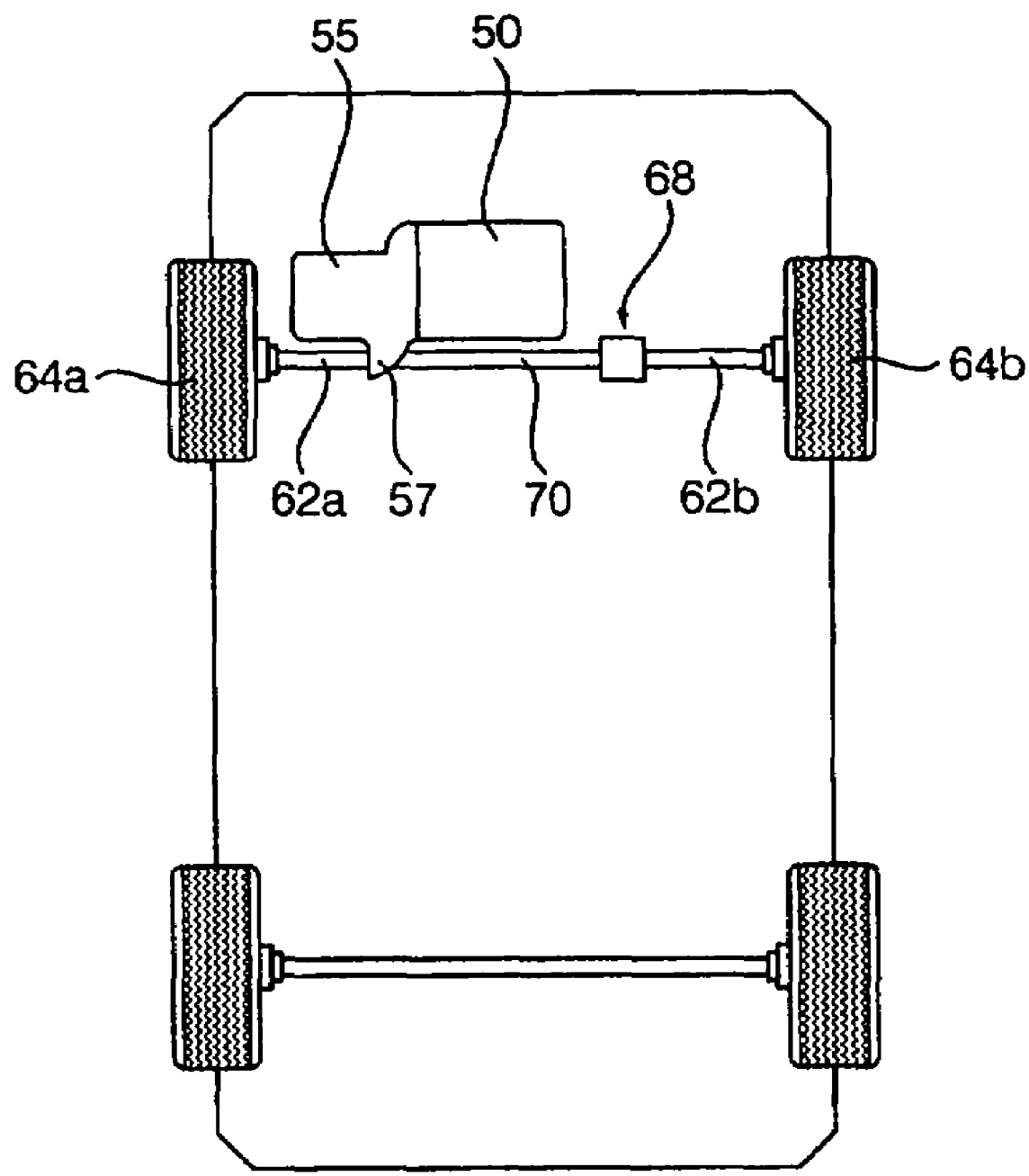
FIG. 1 schematically illustrates a driving system of a front-wheel drive vehicle according to an embodiment of the present invention.

As shown in FIG. 1, a driving system has an engine 50, a transmission 55 connected the output side of the engine 50, and a differential gear 57 connected to the output side of the transmission a transmission 55.

A left wheel drive shaft 62a for a left wheel 64a is directly connected to the differential gear 57, and a right wheel drive shaft 62b for a right wheel 64b is connected to the differential gear 57 with an inner-shaft 70. The left wheel drive shaft 62a and the right wheel drive shaft 62b are driven by the driving force originating from the engine 50.

Figure 2:
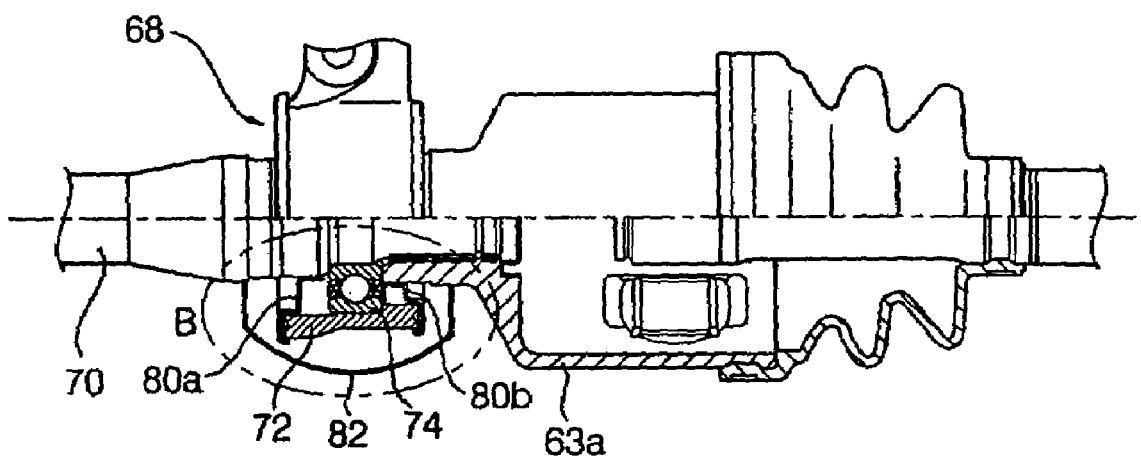
FIG. 2 is a partial cross-sectional view showing a seal structure of an inner-shaft bearing according to an embodiment of the present invention.
Figure 3:
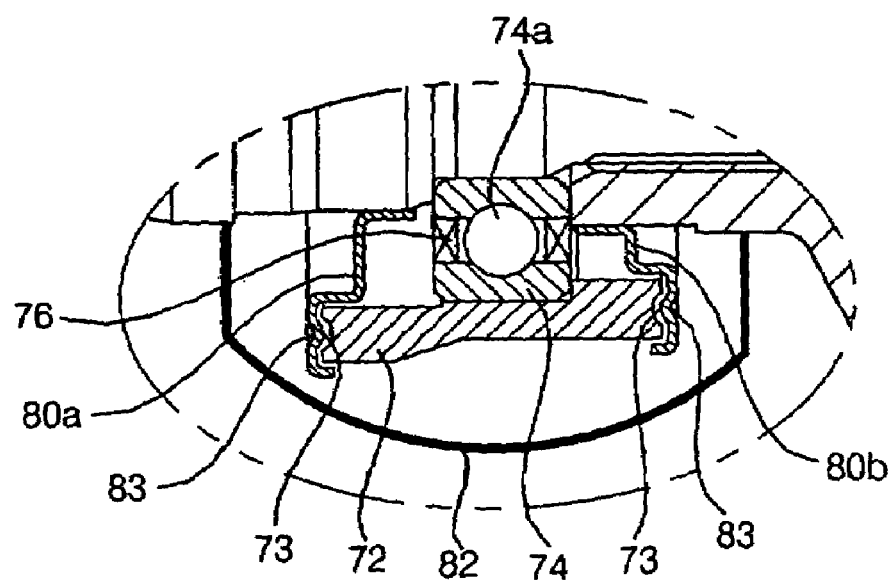
FIG. 3 is a detailed view of a circled portion "B" in FIG. 2.

The inner-shaft 70 is mounted to the vehicle by supporting means 68 in order to interconnect the differential gear 57 and the right wheel drive shaft 62b. The inner-shaft 70 provides for a balance between the left wheel 64a driven by the left wheel drive shaft 62a and the right wheel 64b driven by the right drive shaft 62b. As shown in FIGS. 2 and 3, an inner-shaft bearing 74 is assembled to the circumference of the inner-shaft 70, and the end of the inner-shaft 70 is connected to a lip 63a of the right wheel drive shaft 62b.

The circumference of the inner-shaft bearing 74 is fixed to a bracket 72 such that the inner-shaft 70 is supported by the bracket 72 which is mounted to the vehicle body. Each end of the inner-shaft bearing 74 is provided with an inner-seal member 76 for preventing moisture or dust from infiltrating into the inner-shaft bearing 74 such that wearing and corrosion of a bearing ball 74*a* is prevented. In addition, a first dust cover 80*a* is inserted to the inner-shaft 70 and encloses one end of the bracket 72, and a second dust cover 80*b* is inserted to the inner-shaft 70 and encloses the other end of the bracket 72.

The first and second dust covers 80*a*, 80*b* are shaped with inward steps with respect to the bracket 72 such that the dust covers 80*a*, 80*b* respectively surround the ends of the bracket 72. The distance between the dust covers 80*a*, 80*b* and the bracket 72 is set as about 1 mm such that heat emitted from the inner-shaft bearing 74 is exhausted therethrough.

Furthermore, each end of the bracket 72 has a hollow portion 73, and each of the first and second dust covers 80*a*, 80*b* has a detent portion 83 such that the hollow portion 73 receives the detent portion 83. Accordingly, moisture or dust are prevented from infiltrating into the bracket 72.

Additionally, an auxiliary cover 82 can be assembled to the vehicle body for enclosing the bracket 72 and the dust covers 80*a*, 80*b* for reinforcing the seal structure.

According to the seal structure of this invention, the seal of the inner-shaft bearing can be more efficiently formed and it is possible to make the seal structure of the inner-shaft bearing more simple than the conventional seal structure.

What is claimed is:

1. A seal structure for an inner-shaft bearing of a front-wheel drive vehicle, comprising:

an inner-shaft interconnecting a differential gear to a drive shaft for achieving balance between a left wheel drive shaft and a right wheel drive shaft;

an inner-shaft bearing assembled to the inner shaft and sealed with an inner seal member a bracket connected to the vehicle body and fixed to the circumference of the inner-shaft bearing for supporting the inner-shaft;

a first dust cover inserted to the inner-shaft for enclosing one end of the bracket; and a second dust cover inserted to the drive shaft for enclosing the other end of the bracket, wherein the bracket has two ends with each end having a hollow portion, and each said dust cover having a detent portion such that the hollow portion receives the detent portion.

2. The seal structure of claim 1, wherein the first and second dust covers are inwardly stepped with respect to the bracket such that the dust covers respectively surround the ends of the bracket.

3. The seal structure of claim 1, further comprising an auxiliary cover assembled to the vehicle body for enclosing the bracket and the dust covers.

4. A seat structure for an inner-shaft bearing of a front-wheel drive vehicle, comprising:

inner seal members received in opposite sides of the inner-shaft bearing;

a bracket configured and dimensioned to be fixed to the vehicle for supporting the inner-shaft bearing and to extend around the inner-shaft bearing with opposite ends on opposite sides of the inner-shaft bearing;

first and second dust covers cooperating one each with an opposite end of said bracket such that each dust cover is spaced about one millimeter from said bracket to prevent entry of dust and permit emission of heat; and an auxiliary cover extending around said dust covers and bracket to be secured to the vehicle.

5. The seal structure of claim 4, wherein each end of said bracket defines a recess and each dust cover has a detent portion configured to mate with said recesses.

6. The seal structure of claim 5, wherein each said dust cover is inwardly stepped with respect to said bracket such that said dust covers surround the ends of the bracket.

\* \* \* \* \*